May 25, 1965 W. E. BURNS 3,185,969
CORE-TRANSISTOR LOGICAL DEVICE
Filed Nov. 14, 1960
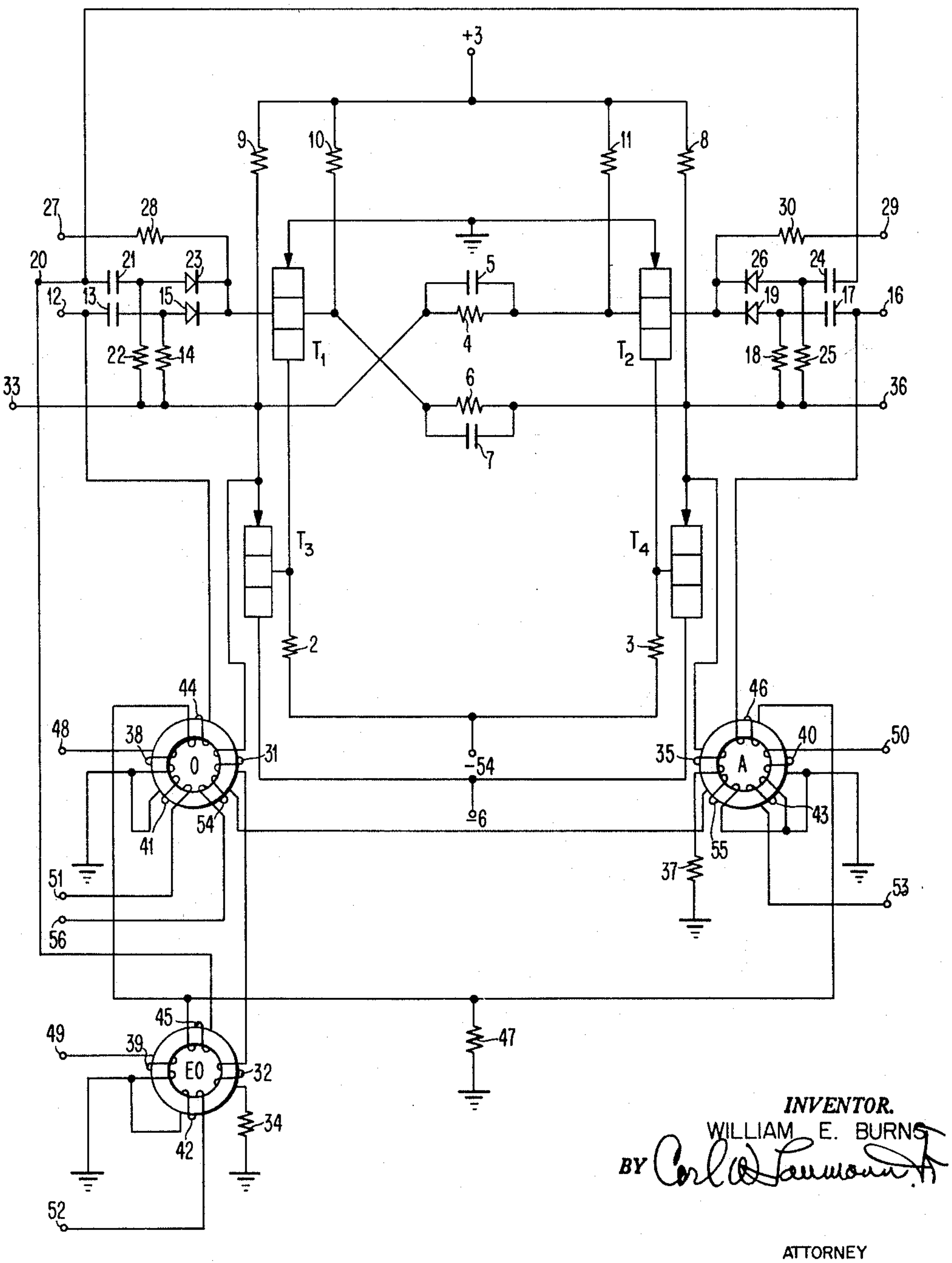
INVENTOR.
WILLIAM E. BURNS
BY Carl A. Lauman, Jr.
ATTORNEY

United States Patent Office 3,185,969
Patented May 25, 1965

3,185,969
CORE-TRANSISTOR LOGICAL DEVICE

William E. Burns, Los Gatos, Calif., assignor to International Business Machines Corporation, New York, N.Y., a corporation of New York Filed Nov. 14, 1960, Ser. No. 69,149
8 Claims. (Cl. 340—174)

This invention relates generally to logical devices and in particular to those devices combining the features of magnetic cores and transistors.

Various forms of logical computer elements have been proposed which combine transistors and magnetic cores. While these devices are capable of performing logical operations in an acceptable manner, they generally are highly specialized and lack compatibility with other, more conventional transistor circuits. Furthermore, they are generally limited to the performance of a single logical operation and lack versatility for this reason. Some of the combinations utilize the core in a regenerative circuit and therefore have limited ability to perform under adverse conditions of temperature and voltage.

The core-transistor device of this invention utilizes a conventional bistable trigger in conjunction with magnetic cores used as storage devices. These storage devices are connected to the trigger in a manner determined by the logical function to be performed. By selecting the core having an output connected to an appropriate trigger input, and an input associated with a particular trigger output, it is possible to perform a multiplicity of logical functions. The function to be performed is selected by supplying the appropriate core with a half-select current during the time when the first binary value is stored in the trigger. Subsequent operations of the trigger do not affect the core since the trigger alone supplies only half of the current required to reverse the magnetic flux in the core. The second binary value on which the logical operation is to be performed is then placed in the trigger, and a readout current is applied to the core. The resulting output pulse will then operate on the trigger to leave it in a state which indicates the result of the logical operation on the first and second binary values. The cores do not interfere with the normal operation of the trigger and the trigger may therefore be used for other functions in the operation of a computer. Furthermore, the logical operation is performed with a minimum of extra components and provides a result in a form compatible with the rest of the circuitry associated with the trigger.

It is therefore an object of this invention to provide a core-transistor logical device which uses magnetic cores in conjunction with a conventional bistable trigger.

It is another object of this invention to provide an improved core-transistor logical device.

It is a still further object of this invention to provide a decision making element having a minimum of components and an output compatible with associated circuitry.

It is a still further object of this invention to provide a core-transistor logical device in which regenerative magnetic circuits are eliminated.

The foregoing and other objects, features and advantages of the invention will be apparent from the following more particular description of a preferred embodiment of the invention as illustrated in the accompanying drawing.

The drawing shows in schematic form a trigger circuit having transistors T1, T2, T3 and T4 utilizing magnetic cores A, O and EO according to the invention.

When the indicated power sources +3, −6 and −54 volts are connected to the circuit as shown in the drawing transistors T3 and T4 will conduct from emitter to collector due to the forward bias applied to their respective bases from the −54 volt power source through resistors 2 and 3. Since T3 and T4 will not conduct exactly the same current, the potential at their emitters will be slightly different. Assuming that T4 conducts more heavily than T3, the smaller voltage drop across T4 causes the emitter to be more negative than the emitter of T3. Since the base of T1 is connected to the emitter of T4 through the parallel combination of resistor 6 and capacitor 7, T1 will be forward biased and conduct more than T2. This is due to the greater negative voltage present at the base of T1 than is transferred to the base of T2 by the parallel connection of resistor 4 and capacitor 5 leading from the emitter of T3.

When the base of T1 is more negative than the base of T2, conduction through T1 will exceed that through T2, raising the collector of T1 toward ground and lowering the collector of T2 toward −54 volts, thereby reducing the forward bias at the base of T3 and increasing the forward bias at the base of T4. This is evident since as transistors T1 or T2 conduct between the emitter and collector, they tend to reduce the forward bias on T3 and T4, respectively, by raising the bases toward ground potential.

As conduction through T3 is reduced, the voltage drop across resistor 9 is decreased and the base of T2 is driven more positive, tending to further reduce the current between the emitter and collector of T2. Reduced current through T2 decreases the voltage drop across resistor 3, making the base of T4 more negative and thereby increasing conduction through T4. At the same time, increased current through T4 increases the voltage drop across resistor 8 to drive the base of T1 more negative.

Regeneration continues as described until the emitter collector circuit of T2 is cut off and the emitter collector circuit of T1 is biased to saturation, leaving T4 conducting more heavily than T3.

This is considered the 0 state of the trigger, with T1 conducting and T2 cut off. The trigger may be changed to the 1 state, with T2 conducting and T1 cut off, by applying a suitable positive pulse to terminal 12 which is connected to the base of transistor T1 through capacitor 13 and diode 15.

The combination of capacitor 13, resistor 14 and diode 15 operates as a gate to pass a positive pulse when a positive conditioning voltage has been previously applied to resistor 14 at the end opposite from the junction of capacitor 13 and diode 15. Operation of this gating circuit is described more fully in U.S. Patent 2,580,771 and will not be further discussed since it is incidental to the operation of this invention.

When the positive pulse reaches the base of T1, it momentarily overcomes the negative bias voltage present at the base through the voltage dividing action of resistor 10 and resistor 6. This causes T1 to be cut off, which increases the forward bias of T3 and increases the current between the emitter and collector of T3. As the current through T3 is increased, the emitter becomes more negative as a result of the higher voltage drop across resistor 9. The increased negative voltage at the emitter of T3 is applied to the base of T2 through the parallel combination of resistor 4 and capacitor 5 to increase the current flowing between the emitter and base of T2. The increased current through T2 decreases the forward bias at the base of T4, causing this transistor to conduct less heavily. As the emitter of T4 goes more positive, the base of T1 also goes positive due to the interconnection through the parallel combination of resistor 6 and capacitor 7.

Regeneration continues until T1 is biased to cutoff and T2 is saturated. This is the 1 state of the trigger. At this point T3 will be conducting more heavily than T4.

Summarizing the trigger operation, transistors T1 and T2 may be considered cross-coupled inverters having base bias resistors 10 and 11 and load resistors 2 and 3, respectively. The cross coupling is accomplished through inverters T3 and T4 having load resistors 9 and 10 and bias resistors 2 and 3, respectively. The inverters T3 and T4 are connected to the base of the opposite transistor T1 or T2 through the parallel combinations of resistor 4, capacitor 5 and resistor 6, capacitor 7.

A positive pulse applied to terminal 16 is effective to set the trigger to 0 when the gate circuit of capacitor 17, resistor 18 and diode 19 has been conditioned as previously described. Similarly, a positive pulse applied to terminal 12 will set the trigger to 1 when a conditioning voltage has been previously applied to the gate circuit including capacitor 13, resistor 14 and diode 15.

A binary input terminal 20 operates to change the state of the trigger on application of a positive pulse. This terminal is connected to a gate circuit including capacitor 21, resistor 22 and diode 23 associated with the 1 side and a gate including capacitor 24, resistor 25 and diode 26 on the 0 side.

Input terminal 27 operates through resistor 28 to set the trigger to the 1 state in response to a positive voltage. The trigger remains in the 1 state as long as a positive voltage is present at terminal 27 even though pulses are applied to input terminals 20 and 16 which would otherwise cause the trigger to change to 0.

An input terminal 29 is connected through resistor 30 to the base of T2 to set the trigger to the 0 state in response to a positive voltage.

When the trigger is in the 1 state, output terminal 36 is at ground potential and terminal 33 is at −6 volts. Conversely, when the trigger is set to 0, terminal 36 is at −6 volts and terminal 33 is at ground.

To practice the invention, three cores are added to the basic trigger circuit described above. Core O and core EO have half-select windings 31 and 32 connected in series from output terminal 33 to ground through resistor 34. Core A has a half-select winding 35 which is connected to output terminal 36 and to ground through resistor 37. Output terminal 36 is at −6 volts when the trigger contains a 0 and at 0 volts when the trigger contains a 1. Resistor 34 and resistor 37 in series with the select windings 31, 32 and 35 are provided to limit the current through the windings to one-half the amount required to drive cores O, EO and A to saturation. Thus, when output terminal 33 is at −6 volts, sufficient current flows through the select windings 31 and 32 to drive cores O and EO part way to saturation. Similarly, when output terminal 36 is at −6 volts, current will flow through select winding 35 to drive core A part way to saturation.

In addition to the half-select winding, cores O, EO and A contain reset windings 38, 39 and 40 having terminals 48, 49 and 50, and function select windings 41, 42 and 43 having terminals 51, 52 and 53. The memory function select windings 54 and 55 have a common terminal 56. The output winding 46 on core A is connected to terminal 16 on the 0 input side of the trigger. The output winding 44 is connected to terminal 12 on the 1 input side of the trigger. Output winding 45 on core EO is connected to binary input terminal 20. The common side of the output windings are connected in series through an isolation resistor 47 to ground.

The logical AND function is provided by core A. The logical AND function, by definition, provides a 1 output if both binary values to be compared are 1. Should either or both of the values compared be 0, then the output will be 0.

To perform this logical AND operation, the first binary value is placed in the trigger through one of the input terminals 12, 16, 27 or 29. Function select windings 43 associated with core A is then energized. In the event that the first value is a 0 and not a 1, core A will be fully selected since current flows through winding 35 and winding 43 to provide a full-select current sufficient to drive core A to positive saturation. The second value to be compared is then entered into the trigger. The reset winding 40 on core A is then energized, tending to drive the core to negative saturation. The reversed magnetomotive force tends to drive core A to the opposite state of saturation from that induced by windings 35 and 43. Since the core has been previously set to positive saturation by the 0 in the trigger and the reset winding is effective to drive it to negative saturation, an output pulse is produced across winding 46. This pulse is applied to the 0 input terminal 16, setting the trigger to 0 which is the correct result of the logical operation. If the first value had been a 1, there would not have been a half-select current flowing in winding 35 since output terminal 36 is at ground for a 1 and core A would not have been driven to positive saturation. Consequently, no output pulse would be produced by the reset winding. Therefore, if the first value is a 1, the trigger would then be left in the 1 or the 0 state depending on whether the second value is 1 or 0, respectively.

Performance of the logical OR function is accomplished by means of core O. The select winding 31 on this core is connected to output terminal 33. This output is at −6 volts when the trigger is in the 1 state. Therefore, core O will be half-selected by winding 31 when the trigger is set to 1. In performing the logical OR operation, the first value is placed in the trigger and function winding 41 is then energized with a half-select current. The core will be driven to positive saturation in the event that a 1 exists in the trigger, since select winding 31 and function winding 41 each provide a one-half select current.

The second value to be compared is placed in the trigger and the reset winding 38 energized with a full-select current to drive the core to negative saturation. This full-select current causes an output voltage to appear across winding 44 if the core had been previously driven to positive saturation. Output winding 44 is connected to the 1 input terminal of the trigger. Thus, if the first value to be compared is a 1, core O is set to positive saturation. If the second value to be compared is also a 1, the trigger is in the 1 state and the output pulse produced across winding 45 and applied to the 1 input does not change the state of the trigger. However, if the second state of the trigger is 0, the output pulse produced across winding 45 is effective to change the trigger back to the 1 state. In the event that only the second value to be compared is a 1, no output pulse is produced across winding 45 and the trigger remains in the 1 state. Thus, the logical OR function is performed, since the trigger is set to the 1 state in the event that either or both of the values to be compared are 1.

Another frequently performed logical operation is the Exclusive OR. This operation is defined as an output of 1 if either, but not both inputs are 1. Core EO is used to perform this operation. This core has a half-select winding 32 connected between terminal 33 and ground through resistor 34. To perform the Exclusive OR operation, the trigger is set to the first binary value and function select winding 42 is energized. If this value is 1, sufficient current flows through winding 42 and winding 32 to drive the core to positive saturation. In the event that the first value was a 0, the core will be only half-selected by the current in winding 42 since no current will flow in winding 32. The second value to be compared is then placed in the trigger and the reset winding 39 is energized. Current through the reset winding 39 tends to drive the core EO to negative saturation, producing an output pulse across winding 45 in the event that the core had been previously driven to positive saturation by the half-select winding 32 and the function select winding 42. An output pulse produced across output winding 45, which is connected to binary input terminal 20, operates to set the trigger to the opposite state from that in which it previously existed. If the first value placed in the trigger is a 1 and the second value is also a 1, the trigger will be left in the 0 state as a result of the Exclusive OR comparison function. If the first value placed in the trigger is a 0 and the second value is a 1, the trigger will be left in the 1 state at the conclusion of the comparison according to the Exclusive OR function. When both values are 0, the trigger will be left in the 0 state. It will be recognized that certain alternative approaches to the problem of Exclusive OR may be adopted. For example, instead of using a binary input, additional output windings on core EO could be connected to input terminals 33 and 36 and provide the equivalent of a binary input to the trigger.

To accomplish the memory function, a first binary value is placed in the trigger. A half-select current is momentarily applied to terminal 56, causing winding 54 or 55 to half-select cores O and A, respectively. Depending on which of windings 35 and 31 is energized, core O or A will be fully selected and driven to positive saturation. For example, if the trigger is in the 1 state, terminal 33 is at −6 volts and the current through winding 31 coacts with the current through winding 54 to drive core O to positive saturation.

The trigger may then be changed as desired without affecting the condition of core O or core A since winding 54 and 55 are no longer energized.

When it is desired to restore the trigger to the original state, the reset windings 48 and 50 are energized. In the example selected, as 1 was stored leaving core O in positive remanence. Energizing the reset windings to drive the cores to negative saturation produces an output pulse across winding 44 which sets the trigger to the 1 state. Thus, the trigger is restored to the original value without impairing the operation during the period between storing and restoring.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. A device for performing logical operations on first and second binary values comprising: a bistable trigger having first and second output means representing 1 and 0 respectively, said trigger having first and second input means for setting said trigger to 1 and 0 respectively, means, including said input means, for setting said trigger to a first binary value, first and second storage devices having first and second partial select means connected to said first and second output means respectively, logical OR function select means connected to said first storage device, said OR function select means and said first partial select means being operable to fully select said first storage device when the first binary value is a 1, logical AND function select means connected to said second storage device, said AND function select means and said second partial select means being operable to fully select said second storage device when the first binary value is a 0, means, including said input means, for setting said trigger to a second binary value, first and second output terminals for said first and second storage devices respectively, means respectively connecting said first and second output terminals to said first and second trigger input means, and readout means associated with said storage devices for producing an output signal from the fully selected storage device to set said trigger to the value representing the selected logical operation on said first and second binary values.

2. The device of claim 1 wherein: said trigger has a third, binary, input means operative to change the state of said trigger, a third storage device having third partial select means connected to said first output means, Exclusive OR function select means connected to said third storage device, said Exclusive OR function select means and said third partial select means being operable to fully select said third storage device when the first binary value is a 1, a third output terminal for said third storage device, and means connecting said third output terminal to said binary input means.

3. A device for performing logical operations on first and second binary values comprising: a bistable trigger having first and second output means representing 1 and 0 respectively, said trigger having first and second input means for setting said trigger to 1 and 0 respectively, means, including said input means, said trigger to a first binary value, first and second storage devices having first and second partial select means connected to said first and second output means respectively, logical OR function select means connected to said first storage device, said OR function select means and said first partial select means being operable to fully select said first storage device when the first binary value is a 1, logical AND function select means connected to said second storage device, said AND function select means and said second partial select means being operable to fully select said second storage device when the first binary value is a 0, memory function select means connected to said first and second storage devices, said memory function select means and said first and second partial select means coacting to fully select said first or second storage device according to the state of said trigger, means, including said input means, for setting said trigger to a second binary value, first and second output terminals for said first and second storage devices respectively, means respectively connecting said first and second output terminals to said first and second input means, and readout means associated with said storage devices for producing an output signal from the fully selected storage device to set said trigger to the value representing the selected logical operation on said first and second binary values in the case of said OR and AND functions or to restore said trigger to the original state in the case of said memory function.

4. A device for performing logical operations on first and second binary values comprising: a bistable trigger having first and second output means representing 1 and 0 respectively, said trigger having first and second input means for setting said trigger to 1 and 0 respectively, means, including said input means, for setting said trigger to a first binary value, first and second magnetic storage devices having first and second half-select windings connected to said first and second output means respectively, a logical OR function half-select winding on said first device, said OR function winding and said first half-select winding coacting to fully select said first device when the OR function is selected and the first binary value is a 1, a logical AND function half-select winding on said second device, said AND function winding and said second half-select winding coacting to fully select said second device when the AND function is selected and the first binary value is a 0, mean, including said input means, for setting said trigger to a second binary value, first and second output windings on said first and second devices respectively, means respectively connecting said first and second output windings to said first and second input means respectively, and readout means associated with said devices for producing an output signal from the previously selected device to set said trigger to the value representing the selected logical operation on said first and second binary values.

5. The device of claim 4 wherein: said trigger has a third, binary, input means operative to change the state of said trigger, a third magnetic storage device having a third half-select winding connected to said first output means, an Exclusive OR function half-select winding on said third storage device, said Exclusive OR function winding and said third winding coacting to fully select said third device when the Exclusive OR function is selected and the first binary value is a 1, a third output winding on said third device, and means connecting said third output winding to said binary input means.

6. A device for performing logical operations on first and second binary values comprising: a bistable trigger having first and second output means representing 1 and 0 respectively, said trigger having first and second input means for setting said trigger to 1 and 0 respectively, means, including said input means, for setting said trigger to a first binary value, first and second magnetic storage devices having first and second half-select windings connected to said first and second output means respectively, a logical OR function half-select winding on said first device, said OR function winding and said first half-select winding coacting to fully select said first device when the OR function is selected and the first binary value is a 1, a logical AND function half-select winding on said second device, said AND function winding and said second half-select winding coacting to fully select said second device when the AND function is selected and the first binary value is a 0, a memory function half-select winding on said first and second devices, said memory function half-select winding and said first and second half-select windings coacting to fully select said first or second device according to the state of said trigger, means, including said input means, for setting said trigger to a second binary value, first and second output windings on said first and second devices respectively, means respectively connecting said first and second output windings to said first and second input means respectively, and readout windings on said devices for producing an output signal from the previously selected device to set said trigger to the value representing the selected logical operation on said first and second binary values in the case of said OR and AND function or to restore said trigger to the original state in the case of said memory function.

7. A device for performing logical operations on first and second binary values comprising: a bistable trigger having first and second output means representing 1 and 0 respectively, said trigger having first and second input means for setting said trigger to 1 and 0 respectively, means, including said input means, for setting said trigger to a first binary value, first storage means connected to said output means for storing the first of said values according to an OR function select signal, second storage means connected to said output means for storing the first of said values according to an AND function select signal, means, including said input means, for setting said trigger to a second binary value, readout means for producing an output signal from said storage means indicative of the value and function stored therein, means connecting the output signal from said first storage means to said input means whereby said trigger is placed in a state representing the result of a logical OR operation, and means connecting the output signal from said second storage means to said input means whereby said trigger is placed in a state representing the result of a logical AND operation.

8. A device for performing logical operations on first and second binary values comprising: a bistable trigger having first and second output means representing 1 and 0 respectively, said trigger having first and second input means for setting said trigger to 1 and 0 respectively, a third binary input means to said trigger, means, including said input means, for setting said trigger to a first binary value, first storage means connected to said output means for storing the first of said values according to an OR function select signal, second storage means connected to said output means for storing the first of said values according to an AND function select signal, third storage means connected to said output means for storing the first of said values according to an Exclusive OR function select signal, means, including said input means, for setting said trigger to a second binary value, readout means for producing an output signal from said storage means indicative of the value and function stored therein, means connecting the output signal from said first storage means to an input of an input of said input means whereby said trigger is placed in a state representing the result of a logical OR operation, means connecting the output signal from said second storage means to said input means whereby said trigger is placed in a state representing the result of a logical AND operation, and means connecting the output signal from said third storage means to said binary input means whereby said trigger is placed in a state representing the result of a logical Exclusive OR operation.

References Cited by the Examiner

UNITED STATES PATENTS

| | | | |
|---|---|---|---|
| 2,840,801 | 6/58 | Beter et al. | 340—174 |
| 2,909,680 | 10/59 | Moore et al. | 307—88 X |
| 2,941,090 | 6/60 | Lo | 307—88 |
| 2,994,788 | 8/61 | Clark | 307—88 X |
| 2,996,701 | 8/61 | David | 307—88 X |
| 3,008,126 | 11/61 | Estrems | 340—174 |
| 3,048,827 | 8/62 | Wright et al. | 340—174 |

OTHER REFERENCES

Publication I—IBM Technical Disclosure Bulletin, vol. 2, No. 5, February 1960, pp. 81 and 82.

IRVING L. SRAGOW, *Primary Examiner.*

UNITED STATES PATENT OFFICE

CERTIFICATE OF CORRECTION

Patent No. 3,185,969 May 25, 1965

William E. Burns

It is hereby certified that error appears in the above numbered patent requiring correction and that the said Letters Patent should read as corrected below.

Column 6, line 10, after "means,", second occurrence, insert -- for setting --; line 55, for "mean" read -- means --; line 60, strike out "respectively"; column 7, line 21, for "device" read -- devices --; column 8, line 25, strike out "an input of an input of".

Signed and sealed this 19th day of October 1965.

EAL)
test:

ŧNEST W. SWIDER
testing Officer

EDWARD J. BRENNER
Commissioner of Patents